(No Model.) 2 Sheets—Sheet 2.

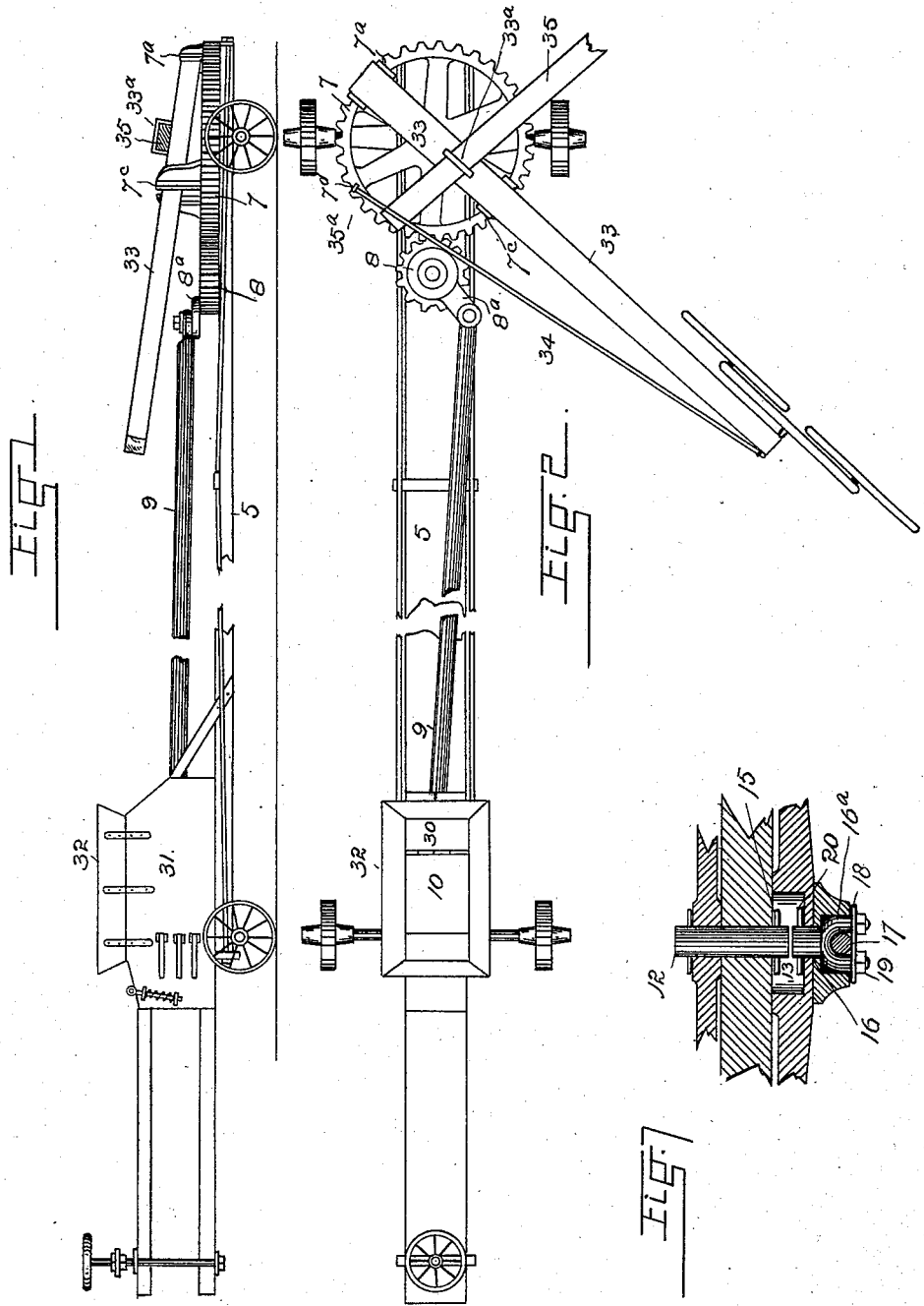

T. H. THURMOND.
BALING PRESS.

No. 539,780. Patented May 21, 1895.

WITNESSES:
G. J. Delandit
Chas. E. Dawson

INVENTOR
T. H. Thurmond
BY
ATTORNEY

UNITED STATES PATENT OFFICE.

TRITOS H. THURMOND, OF DENVER, COLORADO.

BALING-PRESS.

SPECIFICATION forming part of Letters Patent No. 539,780, dated May 21, 1895.

Application filed January 26, 1895. Serial No. 536,392. (No model.)

*To all whom it may concern:*

Be it known that I, TRITOS H. THURMOND, a citizen of the United States of America, residing at Denver, in the county of Arapahoe and State of Colorado, have invented certain new and useful Improvements in Baling-Presses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in baling presses, and consists of the features, arrangements and combinations hereinafter described and claimed, all of which will be fully understood by reference to the accompanying drawings in which is illustrated an embodiment thereof.

Figure 3:
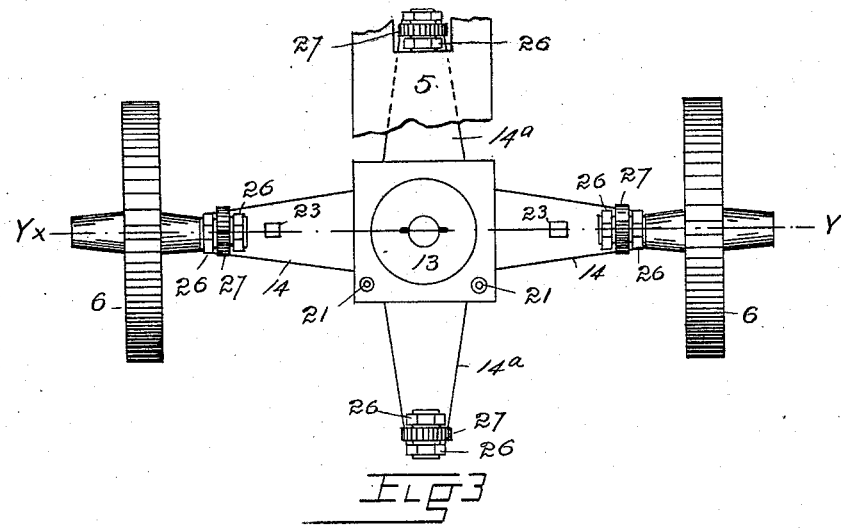
Figure 4:
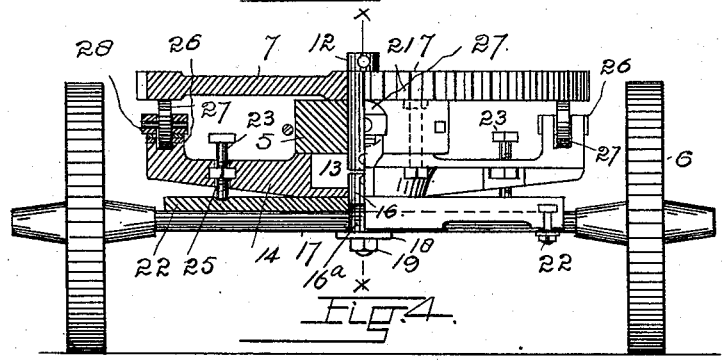
Figure 5:
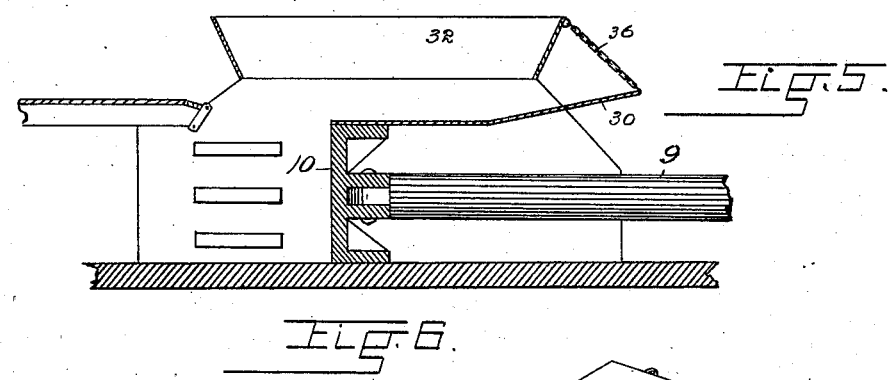
Figure 6:
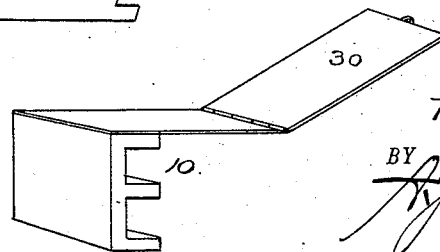

In the drawings, Figure 1 is a side elevation of my improved baling-press. Fig. 2 is a top or plan view of the same. Fig. 3 is a fragmentary plan view partly in section, the main gear-wheel being removed. Fig. 4 is an end view partly in section and partly in elevation. The sectional part of the view is taken on the line $x\ x$, Fig. 3. Fig. 5 is a vertical longitudinal section taken through the baling-chamber. Fig. 6 is a perspective view of the plunger-head. Fig. 7 is a section taken on the line $x\ x$, Fig. 4.

Similar reference characters indicating corresponding parts in these views, let the numeral 5 designate the longitudinal bed plate to which are attached the baling chamber and power mechanism.

As shown in the drawings, the machine is mounted upon wheels 6. When in use, these wheels may be removed from the axles and the mechanism lowered to the ground.

The power mechanism comprises two meshing gears, namely, a large gear 7 and a small gear 8. The small gear has a crank arm 8ª to which is attached a pitman 9 leading to the plunger head 10. The gear wheel 7 is journaled on a vertical pin 12 passed through the gear and the bed plate and projecting into a recess 13 formed in a bolster 14. The lower extremity of this pin is apertured to receive a key pin 15 which retains the vertical pin in place. Another pin 16 connects the front axle 17 with the bolster. The upper extremity of this last named pin projects into the recess 13 of the bolster, while its lower extremity is forked as shown at 16ª to engage the axle. The arms of this fork pass through a cross head 18 and their extremities are threaded to receive nuts 19 screwed to engagement with the cross head. A key pin 20 is forced through the upper extremity of the pin 16. The bolster 14 is secured to the bed plate 5 by bolts 21.

Located between the bolster and the axle is a bearing bar 22 having a flat upper surface and concaved underneath to fit the axle 17. The pin 16 passes through the center of the bar 22. The part of the bar surrounding the pin 16 is widest and forms a suitable bearing surface for the center of the bolster. The bar 22 extends in both directions from the pin 16 and is of such length that its extremities are located in close proximity to the hubs of the wheels. On both sides of the central bearing surface there is a space between the bolster and the bar 22, the bolster being provided with leveling screws 23 which pass through the bolster to engagement with the bearing bar 22. There is one of these leveling screws on each side of the pins 12, 16 which may be said to constitute a divided king pin. The apertures in the bolster through which the leveling screws pass are plain or unthreaded; and the bolster is formed with recesses surrounding the apertures in which are located nuts 25 threaded to receive the leveling screws. These nuts are loose in their respective recesses, but the recesses are so formed that the nuts, being angular in shape, cannot turn therein. The bearing bar 22 is provided with shallow recesses which are engaged by the extremities of the leveling screws. By adjusting the screws 23 the position of the bolster may be properly regulated.

Besides the arms that receive the leveling screws, the bolster is provided with two additional arms 14ª extending at right angles to the other arms. Each arm of the bolster is provided with a pair of upwardly projecting forked lugs 26 separated by a recess in which is located a track wheel 27 whose journals engage boxes 28 located in the forks of the lugs 26. These boxes 28 are vertically movable between the arms of their supporting lugs and may be adjusted by means of suitable wedges. (Not shown.) These track wheels are adapted to engage the under surface of the rim of the large gear 7.

Attached to one extremity of the bed plate is the baling chamber 31 provided with the hopper 32.

The gear wheel 7 has an upwardly projecting socket 7$^a$ on its rim for the reception of one extremity of the long lever arm or sweep 33 to the outer end of which the team is attached when the machine is in use. Diametrically opposite the socket 7$^a$, and also attached to the rim of the gear is a support 7$^c$ upon which the lever arm rests.

From the outer extremity of the sweep 33 leads a tie rod 34 whose opposite end is threaded and passed through an apertured lug 7$^d$ on the rim of the wheel 7. The rod is secured to the wheel by means of a nut screwed thereon to engagement with the lug.

The arm or sweep 33 is provided with a staple 33$^a$ through which is passed a bar 35, one extremity of the bar being made fast to the rod 34 by an eye bolt 35$^a$. The rod passes through the eye of the bolt which is inserted in an aperture in the bar and secured by a nut. To the outer or free extremity of the bar are attached the lead straps connected with the heads of the team.

As shown in the drawings, the diameter of the large gear is twice that of the small gear, whereby the latter makes two revolutions to one revolution of the former. The proportion of these gears may, of course, be changed as desired.

To the top of the plunger is attached a plate 30 adapted to close the bottom of the hopper or divide the latter from the baling chamber when the plunger is at its forward limit of movement. In my improved construction, I make this plate longer than is usual in this class of machines to correspond with the increased area of the opening leading into the baling chamber from the hopper, since it is desired to have this opening equal to the length of the stroke of the plunger. In order that this plate may not interfere with the team attached to the sweep when the plunger is at its backward limit of movement, I divide the plate and connect the parts by a hinge. The rear part may be raised on its hinge and is connected with a short chain 36 whose opposite extremity is attached to the adjacent end of the hopper, whereby as the plunger is making the return movement, the movable part of the plate is raised sufficiently to prevent its projecting into the path of the team hitched to the opposite extremity of the sweep.

From the foregoing description, the operation of the machine will be readily understood. The large gear being properly adjusted through the instrumentality of the leveling mechanism herein described, the team is hitched to the sweep 33 and tied to the bar 35. In operating the press, the team travels in a circle.

It will be observed that the arrangement of the parts must be such that the socket 7$^a$ of the gear 7 and the crank arm 8$^a$ of the gear 8 will never reach the same point at the same time. Otherwise, the crank as shown in the drawings, is of sufficient length to engage said socket. It will be readily understood, however, that by making the relative sizes of the two gears such that the diameter of the larger is a multiple of the smaller gear's diameter, the socket of one gear may be so arranged that it will never be in conflict with the crank of the other gear, since the relative positions of the two gears will always remain the same when the larger gear has completed a revolution. In other words, assuming that the position of the larger gear is such that its socket 7$^a$ is as near the smaller gear as it can possibly approach, then if the crank arm of the smaller gear is not in conflict with the socket of the larger gear there never can be a conflict of these parts, since every time the socket of the larger gear is in the position assumed, the crank of the smaller gear will be as far from the socket as when the machine started.

Having thus described my invention, what I claim is—

1. In a baling press, the combination with the bed plate, the baling chamber and the plunger head, of the horizontal gear, the bolster located beneath the gear and pivotally connected to the axle and having four arms carrying track wheels engaging the gear, leveling screws attached to two of the arms, a bearing plate located beneath the bolster and forming seats for the leveling screws, a small gear meshing with the large gear and having a crank arm, and a pitman connecting said crank arm with the plunger head, substantially as described.

2. In a baling press, the combination with the bed plate, of the bolster suitably connected with the bed plate and having arms carrying track wheels, a large gear mounted on the track wheels of the bolster and journaled on a pin passing through the bed plate and projecting into a recess formed in the bolster, leveling screws attached to the bolster, a bearing bar located beneath the bolster and forming seats for the leveling screws, and another pin connecting the bolster and the bearing bar with the axle and projecting into a central recess formed in the bolster, substantially as described.

3. In a baling press, the combination with the bed plate, of the large gear wheel to which power is applied, the bolster having arms carrying track wheels engaging the under surface of the rim of the power wheel, and pivotally connected with the axle leveling screws passing through unthreaded apertures in the arms of the bolster, said arms having recesses surrounding said apertures, nuts located in said recesses and adapted to engage the leveling screws, said nuts being locked from rotation, and a bearing bar located beneath the opening and forming seats for the leveling screws, substantially as described.

4. In a baling press, the combination with the bed plate and axle, of the horizontal gear to which the power is applied, the bolster carrying track wheels engaging the power wheel and pivotally connected with the axle, leveling screws attached to the bolster arms, a bearing bar located beneath the bolster, and a divided king pin connecting the said parts in operative relation, substantially as described.

In testimony whereof I affix my signature in the presence of two witnesses.

TRITOS H. THURMOND.

Witnesses:
CHAS. E. DAWSON,
ALFRED J. O'BRIEN.